US012729267B1

(12) United States Patent
Cui

(10) Patent No.: US 12,729,267 B1
(45) Date of Patent: Sep. 8, 2026

(54) BLOCK SPONGE AND PRODUCTION PROCESS THEREOF

(71) Applicant: GUANGDONG EONJOY TECHNOLOGY LIMITED, Foshan (CN)

(72) Inventor: Jianeng Cui, Foshan (CN)

(73) Assignee: GUANGDONG EONJOY TECHNOLOGY LIMITED, Foshan (CN)

( * ) Notice: Subject to any disclaimer, the term of this patent is extended or adjusted under 35 U.S.C. 154(b) by 0 days.

(21) Appl. No.: 19/386,211

(22) Filed: Nov. 11, 2025

(30) Foreign Application Priority Data

Sep. 1, 2025 (CN) ......................... 202511241216.1

(51) Int. Cl.

| | |
|---|---|
| ***C08G 18/48*** | (2006.01) |
| ***C08G 18/08*** | (2006.01) |
| ***C08K 3/08*** | (2006.01) |
| ***C08K 5/098*** | (2006.01) |
| ***C08K 5/5419*** | (2006.01) |
| *C08G 101/00* | (2006.01) |

(52) U.S. Cl.
CPC ............. *C08G 18/48* (2013.01); *C08G 18/14* (2013.01); *C08K 3/08* (2013.01); *C08K 5/098* (2013.01); *C08K 5/5419* (2013.01); *C08G 2101/00* (2013.01); *C08G 2110/0008* (2021.01); *C08G 2110/0041* (2021.01); *C08G 2110/005* (2021.01); *C08G 2110/0083* (2021.01); *C08K 2003/085* (2013.01)

(58) Field of Classification Search
USPC ............................................................ 528/58
See application file for complete search history.

(56) References Cited

FOREIGN PATENT DOCUMENTS

| | | | |
|---|---|---|---|
| ES | 1271450 U * | 6/2021 | .............. C08L 75/04 |
| WO | WO-2015106363 A1 * | 7/2015 | ............... B82B 3/00 |

OTHER PUBLICATIONS

WO-2015106363-A1 Machine Translation (Year: 2015).*
ES-1271450-U Machine Translation (Year: 2021).*

* cited by examiner

*Primary Examiner* — Terressa Boykin
(74) *Attorney, Agent, or Firm* — Hemisphere Law, PLLC

(57) ABSTRACT

A block sponge and a production process thereof are provided. By optimizing proportions of raw materials and the production process, problems of poor antibacterial property, poor adsorption capacity, insufficient resilience and poor long-term stability of an existing block sponge are solved. Copper ion powder and green tea powder are compounded to achieve broad-spectrum antibacterial (inhibition rate≥95%). Bamboo charcoal powder is added to enhance adsorption performance. The control of a molar ratio of polyether to toluene diisocyanate is combined with gel fragments to optimize foam pore structure, thereby improving the resilience and pore uniformity. By precisely controlling the curing conditions and surface treatment, the product can maintain stable performance after being used in high temperature or long-term use. High-shear mixing and continuous pouring and foaming processes are used to achieve efficient and stable large-scale production, and meet comprehensive needs of multi-functional and high-performance sponge materials.

13 Claims, 1 Drawing Sheet

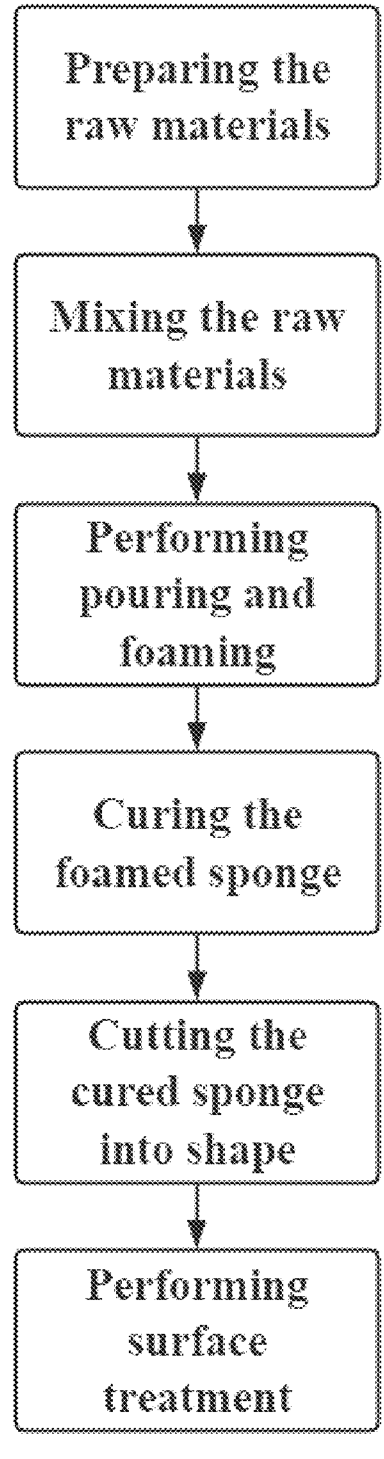
Preparing the raw materials
Mixing the raw materials
Performing pouring and foaming
Curing the foamed sponge
Cutting the cured sponge into shape
Performing surface treatment

BLOCK SPONGE AND PRODUCTION PROCESS THEREOF

TECHNICAL FIELD

The disclosure relates to the field of sponge production technologies, and more particularly to a block sponge and a production process thereof.

BACKGROUND

In the related art, block sponges are widely used in furniture, automotive interiors, filter materials and cleaning supplies. The traditional sponge production process usually uses polyether polyols, isocyanates, water, catalysts, surfactants and other basic raw materials, foam them into shape through a one-step method. However, the sponges in the related art generally have problems such as insufficient antibacterial performance, limited adsorption capacity, poor resilience, and poor long-term use stability, which are difficult to meet the requirements of versatility and durability in high-end application scenarios.

For example, some related art improves the antibacterial properties of sponges by adding a single antibacterial agent, but these methods often have problems such as single antibacterial effect, poor washing resistance, and easy migration of antibacterial agents. In addition, the pore structure control of traditional sponges is not fine enough, which makes it difficult to balance water absorption rate and resilience, affecting their application performance in the fields of water absorption cleaning and cushioning.

Therefore, how to provide a block sponge with good antibacterial, adsorption, resilience and long-term stability, and realize its efficient and stable production by optimizing the ratio of raw materials and process parameters has become an urgent technical problem to be solved in this field.

SUMMARY

In view of this, an objective of the disclosure is to provide a block sponge and a production process thereof to effectively solve the technical defects of single function and unstable performance in the related art, which have a good application prospect.

In order to achieve the above objective, the disclosure provides the following technical solutions.

A block sponge is made from the following raw materials in proportion by mass:

68.7% to 70% of polyether with a molecular weight of 3000; 0.2% to 0.4% of ether amine; 1.6% to 1.8% of water; 24.4% to 25% of toluene diisocyanate; 0.7% to 1.4% of copper ion powder; 0.7% to 0.9% of gel fragments; 0.7% to 1.4% of green tea powder; 0.7% to 1.4% of bamboo charcoal powder; 1.0% to 1.2% of silicone oil; and 0.035% to 0.037% of tin dioctoate.

On the other hand, the disclosure proposes a production process of a block sponge, including the following steps:

- preparing the raw materials, including: mixing the raw materials including polyether with a molecular weight of 3000, ether amine, water, toluene diisocyanate, copper ion powder, gel fragments, green tea powder, bamboo charcoal powder, silicone oil and tin dioctoate in proportion by mass;
- mixing the raw materials, including: mixing the raw materials in a high-shear mixing tank to obtain a mixed liquid;
- performing pouring and foaming, including: pouring the mixed liquid onto a continuously running conveyor belt with a pouring thickness of 50 millimeters (mm) to 80 mm to perform a foaming process, where the foam process is divided into a cream time, a gel time and a cure time, in the cream time, an ambient humidity is controlled at 50% to 60%; in the gel time, a mixture obtained in the cream time is heated to 60 Celsius degrees (° C.) by infrared to assist gelation, to obtain a gelled mixture; and in the cure time, a temperature of the gelled mixture is reduced to 20° C. through a cooling zone to obtain a foamed sponge;
- curing the foamed sponge, including: curing the foamed sponge at a temperature of 25° C. to 30° C. and a humidity of 40% to 50% for 24 hours (h) to 48 h to obtain a cured sponge;
- cutting the cured sponge into shape, including: cutting the cured sponge into required specifications by a five-axis computer numerical control (CNC) cutting machine with a speed of 0.8 meters per minute (m/min) to 1.2 m/min and an accuracy of +0.1 mm, to obtain cut sponges; and
- performing surface treatment, including: performing antibacterial coating, waterproof treatment or decorative film bonding on the surface of each of the cut sponges according to application requirements to obtain the block sponge.

In an embodiment, the mixing the raw materials further includes: performing surface modification treatment on the copper ion powder, the green tea powder and the bamboo charcoal powder, including:

- performing surface treatment on the copper ion powder, the green tea powder and the bamboo charcoal powder with a silane coupling agent, where an amount of the silane coupling agent is 1% of a total mass of the copper ion powder, the green tea powder and the bamboo charcoal powder.

In an embodiment, a speed of the conveyor belt is in a range of 0.3 m/min to 0.5 m/min, and a thickness and a density of the foamed sponge are controlled by adjusting the speed of the conveyor belt.

In an embodiment, in the curing the foamed sponge, a curing time is adjusted according to a thickness of the foamed sponge, and the curing time is extended by 6 h for every 10 mm increase in the thickness of the foamed sponge.

In an embodiment, the cutting the cured sponge into shape further includes: spraying a silicone oil solution with a concentration of 0.5% on a cutting surface of each of the cut sponges.

In an embodiment, in the surface treatment, the antibacterial coating is a silver ion antibacterial agent with a concentration of 0.1%. A drying temperature is 80° C., and a thickness of the antibacterial coating is in a range of 50 microns (μm) to 100 μm. The antibacterial coating needs to be cured by ultraviolet.

In an embodiment, in the mixing the raw materials, a particle size of each of the copper ion powder, the green tea powder and the bamboo charcoal powder is less than or equal to 20 μm, and the copper ion powder, the green tea powder and the bamboo charcoal powder are treated by ultrafine grinding.

In an embodiment, a molar ratio of the polyether to the toluene diisocyanate is 1:1.1-1.2.

In an embodiment, in the mixing the raw materials, a temperature of the high-shear mixing tank is 23±1° C. (i.e., 22° C. to 24° C.), a stirring speed of the high-shear mixing tank is 4000=100 r/min (i.e., 3900 r/min to 4100 r/min), and a mixing time includes 5 seconds(s) of rapid mixing and 2 minutes (min) of low-speed reaction.

Compared with the related art, the block sponge and the production process thereof proposed in the disclosure have the following advantages.

The disclosure solves the problems of poor antibacterial property, poor adsorption capacity, insufficient resilience and poor long-term stability of the existing block sponges by optimizing the ratio of the raw materials and the production process. The copper ion powder and the green tea powder are compounded to achieve broad-spectrum antibacterial (an inhibition rate is above or equal to 95%). The bamboo charcoal powder is added to enhance the adsorption performance. The foam pore structure is optimized by combining the control of the molar ratio of the polyether to the toluene diisocyanate (1:1.1-1.2) and the gel fragments, thereby significantly improving the resilience and pore uniformity. By precisely controlling the curing conditions and surface treatment, the product can maintain stable performance after being used in high temperature or long-term use. High-shear mixing and continuous pouring and foaming processes are used to achieve efficient and stable large-scale production, and meet comprehensive needs of multi-functional and high-performance sponge materials in high-end application scenarios.

BRIEF DESCRIPTION OF DRAWING

FIGURE is a flowchart of a production process of a block sponge according to the disclosure.

DETAILED DESCRIPTION OF EMBODIMENTS

The following will be combined with the drawings of the embodiment to clearly and completely describe the technical scheme of the disclosure. Obviously, the described embodiments are merely some of the embodiments of the disclosure, not all of the embodiments. The specific embodiments described herein are only used to explain the disclosure and are not used to limit the disclosure. Based on the embodiments in the disclosure, all other embodiments obtained by those skilled in the art without making creative labor shall be included in the protection scope of the disclosure.

Embodiment 1

A block sponge is provided in this embodiment, made from the following raw materials in proportion by mass: 70% of polyether with a molecular weight of 3000; 0.4% of ether amine; 1.8% of water; 25% of toluene diisocyanate; 1.4% of copper ion powder; 0.9% of gel fragments; 1.4% of green tea powder; 1.4% of bamboo charcoal powder; 1.2% of silicone oil; and 0.037% of tin dioctoate. A molar ratio of the polyether to the toluene diisocyanate is 1:1.1-1.2. A production process of the above block sponge is as follows.

Raw materials are prepared. The raw materials including polyether with a molecular weight of 3000, ether amine, water, toluene diisocyanate, copper ion powder, gel fragments, green tea powder, bamboo charcoal powder, silicone oil and tin dioctoate are mixed in proportion by mass.

The raw materials are mixed. The raw materials are mixed in a high-shear mixing tank with a temperature of 23±1° C. (i.e., 22° C. to 24° C.), a stirring speed of 4000±100 r/min (i.e., 3900 r/min to 4100 r/min), and a mixing time of 5 s of rapid mixing and 2 min of low-speed reaction to obtain a mixed liquid. In an embodiment, surface modification treatment is performed on the copper ion powder, the green tea powder and the bamboo charcoal powder. Specifically, surface modification is performed on the copper ion powder, the green tea powder and the bamboo charcoal powder with a silane coupling agent, and an amount of the silane coupling agent is 1% of a total mass of the copper ion powder, the green tea powder and the bamboo charcoal powder. A particle size of each of the copper ion powder, the green tea powder and the bamboo charcoal powder is less than or equal to 20 μm, and the copper ion powder, the green tea powder and the bamboo charcoal powder are treated by ultrafine grinding.

Pouring and foaming are performed. The mixed liquid is poured onto a continuously running conveyor belt with a pouring thickness of 50 mm to 80 mm to perform a foaming process. The foaming process is divided into a cream time, a gel time and a cure time. In the cream time, an ambient humidity is controlled at 50% to 60%. In the gel time, a mixture obtained in the cream time is heated to 60° C. by infrared to assist gelation, to obtain a gelled mixture. In the cure time, a temperature of the gelled mixture is reduced to 20° C. through a cooling zone to obtain a foamed sponge. In an embodiment, a speed of the conveyor belt is in a range of 0.3 m/min to 0.5 m/min, and a thickness and a density of the foamed sponge are controlled by adjusting the speed of the conveyor belt.

The foamed sponge is cured. The foamed sponge is cured at a temperature of 25° C. to 30° C. and a humidity of 40% to 50% for 24 h to 48 h to obtain a cured sponge. In an embodiment, a curing time is adjusted according to a thickness of the foamed sponge, and the curing time is extended by 6 h for every 10 mm increase in the thickness of the foamed sponge.

The cured sponge is cut into shape. The cured sponge is cut into required specifications by a five-axis CNC cutting machine with a speed of 0.8 m/min to 1.2 m/min and an accuracy of =0.1 mm, to obtain cut sponges. In an embodiment, a silicone oil solution with a concentration of 0.5% is sprayed on a cutting surface of each of the cut sponges.

Surface treatment is performed. Antibacterial coating, waterproof treatment or decorative film bonding are performed on a surface of each of the cut sponges according to application requirements to obtain the block sponge. In an embodiment, the antibacterial coating is a silver ion antibacterial agent with a concentration of 0.1%, a drying temperature is 80° C., and a thickness of the antibacterial coating is in a range of 50 μm to 100 μm. The antibacterial coating needs to be cured by ultraviolet.

Embodiment 2

A block sponge is provided in this embodiment, made from the following raw materials in proportion by mass: 69% of polyether with a molecular weight of 3000; 0.3% of ether amine; 1.7% of water; 24% of toluene diisocyanate; 1.0% of copper ion powder; 0.8% of gel fragments; 1.0% of green tea powder; 1.0% of bamboo charcoal powder; 1.1% of silicone oil; and 0.036% of tin dioctoate. A molar ratio of polyether to toluene diisocyanate is 1:1.1-1.2.

A production process of the above block sponge is as follows.

Raw material are prepared. The raw materials including polyether with a molecular weight of 3000, ether amine, water, toluene diisocyanate, copper ion powder, gel fragments, green tea powder, bamboo charcoal powder, silicone oil and tin dioctoate are mixed in proportion by mass.

The raw materials are mixed. The raw materials are mixed in a high-shear mixing tank with a temperature of 23±1° C.

(i.e., 22° C. to 24° C.), a stirring speed of 4000±100 r/min (i.e., 3900 r/min to 4100 r/min), and a mixing time of 5 s of rapid mixing and 2 min of low-speed reaction to obtain a mixed liquid. In an embodiment, surface modification treatment is performed on the copper ion powder, the green tea powder and the bamboo charcoal powder. Specifically, surface modification is performed on the copper ion powder, the green tea powder and the bamboo charcoal powder with a silane coupling agent, and an amount of the silane coupling agent is 1% of a total mass of the copper ion powder, the green tea powder and the bamboo charcoal powder. A particle size of each of the copper ion powder, the green tea powder and the bamboo charcoal powder is less than or equal to 20 μm, and the copper ion powder, the green tea powder and the bamboo charcoal powder are treated by ultrafine grinding.

Pouring and foaming are performed. The mixed liquid is poured onto a continuously running conveyor belt with a pouring thickness of 50 mm to 80 mm to perform a foaming process. The foaming process is divided into a cream time, a gel time and a cure time. In the cream time, an ambient humidity is controlled at 50% to 60%. In the gel time, a mixture obtained in the cream time is heated to 60° C. by infrared to assist gelation, to obtain a gelled mixture. In the cure time, a temperature of the gelled mixture is reduced to 20° C. through a cooling zone to obtain a foamed sponge. In an embodiment, a speed of the conveyor belt is in a range of 0.3 m/min to 0.5 m/min, and a thickness and a density of the foamed sponge are controlled by adjusting the speed of the conveyor belt.

The foamed sponge is cured. The foamed sponge is cured at a temperature of 25° C. to 30° C. and a humidity of 40% to 50% for 24 h to 48 h to obtain a cured sponge. In an embodiment, a curing time is adjusted according to a thickness of the foamed sponge, and the curing time is extended by 6 h for every 10 mm increase in the thickness of the foamed sponge.

The cured sponge is cut into shape. The cured sponge is cut into required specifications by a five-axis CNC cutting machine with a speed of 0.8 m/min to 1.2 m/min and an accuracy of +0.1 mm, to obtain cut sponges. In an embodiment, a silicone oil solution with a concentration of 0.5% is sprayed on a cutting surface of each of the cut sponges.

Surface treatment is performed. Antibacterial coating, waterproof treatment or decorative film bonding are performed on a surface of each of the cut sponges according to application requirements to obtain the block sponge. In an embodiment, the antibacterial coating is a silver ion antibacterial agent with a concentration of 0.1%, a drying temperature is 80° C., and a thickness of the antibacterial coating is in a range of 50 μm to 100 μm. The antibacterial coating needs to be cured by ultraviolet.

Embodiment 3

As shown in FIGURE, a production process of a block sponge is provided in this embodiment.

The production process includes the following steps.

1. Preparation of Raw Materials

In the embodiment, the raw materials for producing the block sponge include polyether with a molecular weight of 3000, ether amine, water, toluene diisocyanate, copper ion powder, gel fragments, green tea powder, bamboo charcoal powder, silicone oil and tin dioctoate, and mass proportions of the raw materials are as follows.

A mass proportion of the polyether (3000 molecular weight) is 68.7%. The polyether is a main substrate, which provides the basic structure and physical properties of the sponge. The choice of a range of the molecular weight needs to balance foaming efficiency and mechanical strength.

A mass proportion of the ether amine is 0.2%. The ether amine is a chain extender, which promotes the extension of the polyurethane molecular chain and improves the elasticity of the foam. Excessive ether amine may lead to increased foam brittleness.

A mass proportion of the water is 1.6%. The water reacts with isocyanic acid to generate carbon dioxide gas as a foaming agent. The amount of the water should be strictly controlled to avoid excessive foaming or foam collapse.

A mass proportion of the toluene diisocyanate is 24.4%. The toluene diisocyanate is a crosslinking agent, which determines the hardness and density of the sponge. The amount of the toluene diisocyanate should be matched with the mass proportion of the polyether to avoid unreacted residues.

A mass proportion of the copper ion powder (additive) is in a range of 0.7% to 1.4%. The copper ion powder provides antibacterial property and adjusts the color stability of the sponge. The copper ion powder should be calcined at a high temperature to enhance dispersion.

A mass proportion of the gel fragments (additive) is 0.7%. The gel fragments are used as a filler, which optimizes the foam pore structure and improves the resilience. The gel fragments should be pretreated to make the particle size less than or equal to 50 μm to ensure uniformity.

A mass proportion of the green tea powder (additive) is in a range of 0.7% to 1.4%. The green tea powder endows a natural antibacterial function for the sponge and improves the antioxidant properties of sponge. The green tea powder should be treated by ultrafine grinding to make the particle size of the green tea powder less than or equal to 20 μm to improve the activity.

A mass proportion of the bamboo charcoal powder is in a range of 0.7% to 1.4%. The bamboo charcoal powder enhances the adsorption performance and gives a dark appearance for the sponge. The bamboo charcoal powder needs activation treatment to increase the specific surface area (above or equal to 500 square meters per gram abbreviated as $m^2/g$).

A mass proportion of the silicone oil (surfactant) is 1.0%. The silicone oil is a foam stabilizer, which prevents foam from bursting and adjusts the size of the foam holes. The silicone oil should select hydrogen-containing silicone oil to improve compatibility.

A mass proportion of the tin dioctoate (catalyst) is 0.035%. The tin dioctoate accelerates the reaction of isocyanic acid and hydroxyl, and shortens the curing time. The amount of the tin dioctoate should be controlled to avoid uneven foam caused by too fast catalysis.

The mass proportions of the raw materials are optimized by multi-factor orthogonal experiment to ensure the synergistic effect of each component. For example, a molar ratio of the polyether to the toluene diisocyanate is 1:1.1-1.2 to avoid unreacted isocyanic acid residues. The combination of the copper ion powder and the green tea powder can achieve broad-spectrum antibacterial (the inhibition rates of *Escherichia coli* and *Staphylococcus aureus* are above or equal to 95%). The control of particle sizes and surface treatment of the additives (such as silane coupling agent for modification) further improve the dispersibility and functionality.

2. Mixing of Raw Materials

The raw materials are added in a high-shear mixing tank according to the above mass proportions. Mixing conditions include: a temperature of 22° C. to 24° C. (temperature is controlled by cold water circulation jacket), a stirring speed of 3900 r/min to 4100 r/min (using a twin planetary impeller, which has a speed gradient that the initial stirring speed is accelerated to the target value at 500 r/min), and a mixing time of 5 s (rapid mixing)+2 min (low-speed reaction).

The raw materials are pretreated. The surface modification needs to be performed on the copper ion powder, the green tea powder and the bamboo charcoal powder with a silane coupling agent (KH-550, an amount of the silane coupling agent is 1% of a total mass of the copper ion powder, the green tea powder and the bamboo charcoal powder) to obtain modified additives (i.e., the copper ion powder, the green tea powder and the bamboo charcoal powder), and the modified additives are dried for later use. The silicone oil needs to be preheated to 30° C. to reduce viscosity, so that it can be mixed easily.

The order of mixing is as follows. Firstly, the polyether, the ether amine and the water are added and stirred at a high speed to completely dissolve (about 30 s). Then, the toluene diisocyanate is added slowly (add in three times, each interval of 10 s) to avoid local overheating. At last, the modified additives and the silicone oil are added and stirred at a low speed for 2 min to ensure uniform dispersion.

By controlling the mixing parameters, bubble breakup caused by rapid local reaction can be avoided. Experiments show that when the stirring speed is less than 3800 r/min, the green tea powder will be easy to agglomerate. When the stirring speed is higher than 4200 r/min, the silicone oil will destroy the foam stability. The low-speed stirring in the secondary reaction stage helps to eliminate bubbles and improve mixing uniformity.

3. Pouring and Foaming

The mixed liquid is transported to a continuously running conveyor belt (a speed of the conveyor belt is in a range of 0.3 m/min to 0.5 m/min) by a pipeline. A pouring thickness is 50 mm to 80 mm. The foaming process is divided into three stages, including cream time, gel time and cure time.

In the cream time (0 s to 30 s), the water reacts with the toluene diisocyanate to generate carbon dioxide ($CO_2$). The liquid volume expands rapidly to twice the initial volume. The ambient humidity is controlled at 50% to 60% to avoid premature curing of the surface layer.

In the gel time (30 s to 2 min), the foam structure is initially stable, and the porosity can reach more than 90%. The curing time is shortened by infrared heating (60° C.) assisted gelation.

In the cure time (2 min to 5 min), the foam is completely shaped to form an open pore structure with a closed porosity of less or equal to 5%. A cooling zone is defined at an end of the conveyor belt (the temperature drops to 20° C.) to prevent overreaction in the curing treatment.

The speed of the conveyor belt directly affects the thickness and the density of the foamed sponge. Experimental data shows that when the speed of the conveyor belt increases from 0.3 m/min to 0.6 m/min, the density of the foamed sponge decreases from 0.035 grams per cubic centimeter ($g/cm^3$) to 0.028 $g/cm^3$, but the resilience decreases by 15%. Hardness of the surface of the foamed sponge can be controlled by adjusting a wind speed (1 meter per second, abbreviated as m/s to 2 m/s) of the cooling zone to meet the needs of different application scenarios.

4. Curing Treatment

The foamed sponge needs to be cured at a temperature of 25° C. to 30° C. (by a constant temperature oven or natural room temperature) and a humidity of 40% to 50% (controlled by a dehumidifier) for 24 h to 48 h (adjusted according to the thickness of the foamed sponge, and the curing time is extended by 6 h for every 10 mm increase in the thickness of the foamed sponge).

In the process of curing, the incompletely reacted chemical bonds continue to crosslink, thereby increasing the tensile strength (from 0.15 megapascals, abbreviated as MPa to 0.22 MPa) and tear strength (from 1.8 kilonewtons per meter, abbreviated as kN/m to 2.5 kN/m). Experiments show that the permanent compression deformation rate increases by 20% when the curing time is less than 24 h, while the performance is only increased by 3% when the curing time extends to 72 h, the cost-effectiveness is decreased.

5. Cutting into Shape

The cured sponge is cut through the following steps.

Pre-inspection: an X-ray detector is used to scan internal defects (such as bubbles, cracks) of the cured sponge, thereby eliminating unqualified products.

Cutting parameters: the equipment is a five-axis CNC cutting machine (cut tool: diamond coated saw blade, a stirring speed is 12000 r/min), and is used at a speed of 0.8 m/min to 1.2 m/min (adjusted according to hardness); and an accuracy is +0.1 mm (calibrated by a laser positioning system).

Post-processing: a silicone oil solution (concentration of 0.5%) is sprayed on the cutting surfaces to reduce burrs. A scrap recovery rate is above or equal to 95% (as additive, gel fragments, after crushing).

The cutting speed is inversely proportional to the hardness. It is found that when the cutting speed exceeds 1.5 m/min, an edge tearing rate increases from 5% to 12%. Sharpness of the diamond blade (an edge radius is less or equal to 5 μm) can reduce fiber breakage and increase the yield to more than 98%.

6. Surface Treatment

According to the target application, the treatment methods are as follows.

Antibacterial coating: a silver ion antibacterial agent (concentration of 0.1%) is coated on the surface of each of the cut sponges. The drying temperature is 80° C., and a thickness of the silver ion antibacterial agent is 50 μm to 100 μm. According to the test, the antibacterial rate is above or equal to 99% (refer to GB/T20944.3-2008: Textiles—Evaluation for antibacterial activity—Part 3: Shake flask method).

Waterproof treatment: fluorocarbon resin (0.3 $g/m^2$) is sprayed on the surface of each of the cut sponge. A contact angle is above or equal to 110°, and a water absorption rate is less or equal to 5%. Decorative film bonding: a Polyethylene terephthalate (PET) decorative film is pasted on the surface of each of the cut sponge with hot melt adhesive (ethylene-vinyl acetate abbreviated as EVA, a melting temperature is 120° C.), and the peel strength is above or equal to 0.8 newtons per millimeter (N/mm).

The antibacterial coating needs to be cured by ultraviolet (365 nanometers abbreviated as nm, 10 s) to enhance adhesion. Experiments show that the antibacterial rate of the coating without curing treatment decreases to 70% after 3 times of washing, while the antibacterial rate of the coating after curing remains stable.

7. Performance Detection and Evaluation

The finished sponge is tested as follows.

Physical properties are tested. A density of the finished sponge is in a range of 0.030 $g/cm^3$ to 0.040 $g/cm^3$ (ASTM D3574: Flexible Cellular Materials Testing). A permanent compression deformation rate of the finished sponge is less or equal to 15% (a recovery time after compression of 50% is 24 h). A tensile strength of the finished sponge is above or equal to 0.2 MPa (ASTM D412: Standard Test Methods for Vulcanized Rubber and Thermoplastic Elastomers-Tension).

Functional properties are tested. A water absorption rate of the finished sponge is above or equal to 500% (after 24 h of soaking). An antibacterial rate of the finished sponge is above or equal to 95% (against *Escherichia coli*, and *Staphylococcus aureus*).

Durability is tested. An abrasion resistance of the finished sponge is shown as no damage on the surface after 1000 times of friction (Taber attrition test).

The water absorption rate is positively correlated with porosity. Experiments show that when the porosity increases from 85% to 92%, the water absorption rate increases from 450% to 600%, but the tensile strength decreases by 10%. Therefore, it is necessary to balance the performance by adjusting the amount of the toluene diisocyanate.

8. Comparative Embodiments and Data Analysis

Comparative Embodiment 1: Reducing the Copper Ion Powder to 0.5%

An experimental objective is to verify the effect of the copper ion powder to the antibacterial property of the sponge.

The experimental steps are as follows.

The amount of the copper ion powder is reduced from 0.7% to 0.5%, and other raw materials are unchanged.

The antibacterial rate (*Escherichia coli*, and *Staphylococcus aureus*), the water absorption rate and the permanent compression deformation rate are tested.

The experiment data is as follows.

| Index | Original formulation (0.7% of copper ion powder) | Comparative embodiment 1 (0.5% of copper ion powder) |
|---|---|---|
| Antibacterial rate (%) | 96.3 (*Escherichia coli*) 94.8 (*Staphylococcus aureus*) | 62.1 (*Escherichia coli*) 58.9 (*Staphylococcus aureus*) |
| Water absorption rate (%) | 520 | 610 |
| permanent compression set rate (%) | 12.5 | 13.2 |

The reduction of the copper ion powder significantly reduces the antibacterial properties, but the water absorption rate increases slightly. This phenomenon indicates that the copper ion powder is an important component of antibacterial function, but its addition amount needs to be synergistic with the green tea powder (the green tea powder itself has antibacterial properties). There is no obvious change in the permanent compression deformation rate, which indicates that the copper ion powder has little effect on the mechanical properties.

Comparative Embodiment 2: Increasing the Ether Amine to 0.3%

An experimental objective is to verify the effect of the ether amine on foaming structure and mechanical properties.

The experiment steps are as follows.

The amount of the ether amine is increased from 0.2% to 0.3%, and other raw materials are unchanged.

The density, the tensile strength and the porosity are tested (testing by micro-computed tomography, abbreviated as CT, scan).

The experiment data is as follows.

| Index | Original formulation (0.2% of ether amine) | Comparative embodiment 2 (0.3% of ether amine) |
|---|---|---|
| Density (g/cm$^3$) | 0.035 | 0.042 |
| Tensile strength (MPa) | 0.22 | 0.16 |
| Porosity (%) | 92.3 | 88.1 |

Excessive ether amine leads to incomplete foaming, decreased porosity and increased density. This result may be due to the fast reaction of the ether amine and isocyanic acid, which inhibits the full expansion of carbon dioxide gas. The tensile strength decreases by 18%, which indicates that the addition of the ether amine should be strictly controlled in the range of 0.2%-0.3%.

Comparative Embodiment 3: Omitting the Bamboo Charcoal Powder

An experimental objective is to verify the effect of the bamboo charcoal powder on adsorption performance and resilience.

The experimental steps are as follows.

1. The bamboo charcoal powder (0.7%) is omitted, and other raw materials are unchanged.
2. The toluene adsorption capacity and resilience recovery time are tested.

The experiment data is as follows.

| Index | Original formulation (with bamboo charcoal powder) | Comparative embodiment 3 (without bamboo charcoal powder) |
|---|---|---|
| Toluene adsorption rate (mg/g) | 125 | 78 |
| Resilience recovery time (s) | 3.2 | 2.8 |

The absence of the bamboo charcoal powder results in a 40% decrease in adsorption performance, but a slight increase in resilience. It indicates that the using of the bamboo charcoal powder sacrifices some elasticity in exchange for stronger adsorption capacity. In applications that require high adsorption properties (such as filter media), the bamboo charcoal powder is irreplaceable; in scenes that require higher elasticity (such as mattresses), the amount of the bamboo charcoal powder can be appropriately reduced.

9. Optimization Experiment of Process Parameters

Experiment 1: Effect of Mixing Temperature on Mixing Uniformity.

The experimental steps are as follows.

1. The mixing temperature is adjusted from 23° C. to 20° C., 25° C. and 30° C., and other conditions remain unchanged.
2. The mixing uniformity (phase separation is observed by a microscope) and the density of the finished product are tested.

The experiment data is as follows.

| Temperature (° C.) | Degree of phase separation (visual rating from 1 to 5) | Density (g/cm$^3$) |
|---|---|---|
| 20 | 3 | 0.038 |
| 23 | 1 | 0.035 |

-continued

| Temperature (° C.) | Degree of phase separation (visual rating from 1 to 5) | Density (g/cm$^3$) |
|---|---|---|
| 25 | 2 | 0.036 |
| 30 | 4 | 0.040 |

Too low temperature (20° C.) leads to uneven mixing, and too high temperature (30° C.) accelerates local reaction and affects foam structure. The optimum mixing temperature is 23° C., which is consistent with the process parameter described above.

Experiment 2: Control Effect of the Speed of the Conveyor Belt on Density and the Thickness of the Sponge The experimental steps are as follows.

1. The speed of the conveyor belt is adjusted to 0.3 m/min, 0.5 m/min, and 0.7 m/min, and the change of the thickness and the density of the sponge is observed.
2. The permanent compression deformation rate is tested.

The experiment data is as follows.

| Speed (m/min) | Thickness (mm) | Density (g/cm$^3$) | Permanent compression set rate (%) |
|---|---|---|---|
| 0.3 | 75 | 0.033 | 11.8 |
| 0.5 | 62 | 0.036 | 13.1 |
| 0.7 | 50 | 0.039 | 15.5 |

The faster the speed of the conveyor belt, the thinner and denser the sponge, but the permanent compression deformation rate increases significantly. The recommended speed range is 0.3-0.5 m/min to balance thickness, density and resilience.

10. Long-Term Stability Test

An experimental objective is to verify the performance attenuation of sponge in long-term use.

The experimental steps are as follows.

1. Samples are put in a constant temperature box at a temperature of 60° C. for 72 h to simulate the aging state in high temperature environment.
2. The tensile strength, the water absorption rate and the antibacterial rate are tested.

The experiment data is as follows.

| Index | Original sample | Aging sample (72 h) | Attenuation rate (%) |
|---|---|---|---|
| Tensile strength (MPa) | 0.22 | 0.19 | 13.6 |
| Water absorption rate (%) | 520 | 480 | 7.7 |
| Antibacterial rate (*Escherichia coli*) | 96.3 | 92.1 | 4.4 |

The performance attenuation after aging is slight, which indicates that the formula of the disclosure described above has good thermal stability. The synergistic effect of the copper ion powder and the green tea powder may delay the decline of the antibacterial properties.

By the above experiments, the rationality of the formula in the embodiment is verified, and the optimization range of key process parameters is clarified. Comparative experiments further prove the importance of raw material ratio, such as the contribution of the copper ion powder to antibacterial properties, and the influence of the ether amine on foaming structure.

In summary, the disclosure solves the problems of poor antibacterial property, poor adsorption capacity, insufficient resilience and poor long-term stability of the block sponge in the related art by optimizing the proportions of the raw materials and the production process. The copper ion powder and the green tea powder are compounded to achieve broad-spectrum antibacterial (inhibition rate is above or equal to 95%). The bamboo charcoal powder is added to enhance the adsorption performance. The foam pore structure is optimized by combining the control of the molar ratio of the polyether to the toluene diisocyanate (1:1.1-1.2) and the gel fragments, thereby improving the resilience and pore uniformity. By precisely controlling the curing conditions and surface treatment, the product can maintain stable performance after being used in high temperature or long-term use. High-shear mixing and continuous pouring and foaming processes are used to achieve efficient and stable large-scale production, and meet comprehensive needs of multi-functional and high-performance sponge materials in high-end application scenarios.

Finally, it should be noted that the above descriptions are merely some of the embodiments of the disclosure, and is not used to limit the disclosure. Although the disclosure has been described in detail with reference to the aforementioned embodiments, it is still possible for those skilled in the art to modify the technical solutions described in the aforementioned embodiments, or to make equivalent substitutions for some of the technical features. Any modifications, equivalent substitutions, and improvements made within a spirit and principles of the disclosure should be included within the scope of protection of the disclosure.

What is claimed is:

1. A block sponge produced by continuous pouring and foaming process, wherein the block sponge is made from the following raw materials in proportion by mass:

68.7% to 70% of polyether with a molecular weight of 3000; 0.2% to 0.4% of ether amine; 1.6% to 1.8% of water; 24.4% to 25% of toluene diisocyanate; 0.7% to 1.4% of copper ion powder; 0.7% to 0.9% of gel fragments having a particle size of less than or equal to 50 microns (μm); 0.7% to 1.4% of green tea powder; 0.7% to 1.4% of bamboo charcoal powder; 1.0% to 1.2% of silicone oil; 0.035% to 0.037% of tin dioctoate; and a molar ratio of the polyether to the toluene diisocyanate is 1:1.1-1.2.

2. A production process of the block sponge as claimed in claim 1, comprising:

preparing the raw materials, comprising: mixing the raw materials comprising the polyether, the ether amine, the water, the toluene diisocyanate, the copper ion powder, the gel fragments, the green tea powder, the bamboo charcoal powder, the silicone oil and the tin dioctoate in proportion by mass;

mixing the raw materials, comprising: mixing the raw materials in a mixing tank to obtain a mixed liquid;

performing pouring and foaming, comprising: pouring the mixed liquid onto a continuously running conveyor belt with a pouring thickness of 50 millimeters (mm) to 80 mm to perform a foaming process, wherein the foam process is divided into a cream time, a gel time and a cure time, in the cream time, an ambient humidity is controlled at 50% to 60%; in the gel time, a mixture obtained in the cream time is heated to 60 Celsius degrees (° C.) by infrared to assist gelation, to obtain a gelled mixture; and in the cure time, a temperature of the gelled mixture is reduced to 20° C. through a cooling zone to obtain a foamed sponge;

curing the foamed sponge, comprising: curing the foamed sponge at a temperature of 25° C. to 30° C. and a humidity of 40% to 50% for 24 hours (h) to 48 h to obtain a cured sponge;

cutting the cured sponge into shape, comprising: cutting the cured sponge into required specifications by a five-axis computer numerical control (CNC) cutting machine with a speed of 0.8 meters per minute (m/min) to 1.2 m/min and an accuracy of ±0.1 mm, to obtain cut sponges; and performing surface treatment, comprising: performing antibacterial coating, waterproof treatment or decorative film bonding on a surface of each of the cut sponges according to application requirements to obtain the block sponge.

3. The production process as claimed in claim 2, wherein the mixing the raw materials further comprises: performing surface modification treatment on the copper ion powder, the green tea powder and the bamboo charcoal powder, comprising:

performing surface treatment on the copper ion powder, the green tea powder and the bamboo charcoal powder with a silane coupling agent, wherein an amount of the silane coupling agent is 1% of a total mass of the copper ion powder, the green tea powder and the bamboo charcoal powder.

4. The production process as claimed in claim 2, wherein a speed of the conveyor belt is in a range of 0.3 m/min to 0.5 m/min, and a thickness and a density of the foamed sponge are controlled by adjusting the speed of the conveyor belt.

5. The production process as claimed in claim 2, wherein, in the curing the foamed sponge, a curing time is adjusted according to a thickness of the foamed sponge, and the curing time is extended by 6 h for every 10 mm increase in the thickness of the foamed sponge.

6. The production process as claimed in claim 2, wherein the cutting the cured sponge into shape further comprises: spraying a silicone oil solution with a concentration of 0.5% on a cutting surface of each of the cut sponges.

7. The production process as claimed in claim 2, wherein, in the surface treatment, the antibacterial coating is a silver ion antibacterial agent with a concentration of 0.1%, a drying temperature is 80° C., and a thickness of the antibacterial coating is in a range of 50 microns (μm) to 100 μm; and the antibacterial coating is cured by ultraviolet.

8. The production process as claimed in claim 2, wherein, in the mixing the raw materials, a particle size of each of the copper ion powder, the green tea powder and the bamboo charcoal powder is less than or equal to 20 μm, and the copper ion powder, the green tea powder and the bamboo charcoal powder are treated by ultrafine grinding.

9. The production process as claimed in claim 2, wherein, in the mixing the raw materials, a temperature of the mixing tank is in a range of 22° C. to 24° C., a stirring speed of the mixing tank is in a range of 3900 revolutions per minute (r/min) to 4100 r/min, and a mixing time is 5 seconds(s) of mixing and 2 minutes (min) of reaction.

10. The production process as claimed in claim 2, wherein, in the cream time, an ambient humidity is controlled at 50% to 60%.

11. The production process as claimed in claim 7, wherein the waterproof treatment comprises spraying a fluorocarbon resin on the surface of each of the cut sponges at an amount of 0.3 grams per square meter (g/$m^2$).

12. The production process as claimed in claim 11, wherein the decorative film bonding comprises pasting a polyethylene terephthalate (PET) decorative film on the surface of each of the cut sponges with ethylene-vinyl acetate (EVA) having a melting temperature of 120° C.

13. The production process as claimed in claim 7, wherein the antibacterial coating is cured by ultraviolet with a wavelength of 365 nanometers (nm) for 10 s.

* * * * *